US010396523B1

(12) United States Patent
Goodno et al.

(10) Patent No.: US 10,396,523 B1
(45) Date of Patent: Aug. 27, 2019

(54) SUPPRESSION OF POLARIZATION MODULATION INSTABILITY IN HIGH POWER FIBER AMPLIFIER SYSTEMS

(71) Applicant: NORTHROP GRUMMAN SYSTEMS CORPORATION, Falls Church, VA (US)

(72) Inventors: Gregory D. Goodno, Los Angeles, CA (US); Joshua E. Rothenberg, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 224 days.

(21) Appl. No.: 15/496,937

(22) Filed: Apr. 25, 2017

(51) Int. Cl.

| | |
|---|---|
| ***G02F 1/01*** | (2006.01) |
| ***H01S 3/13*** | (2006.01) |
| ***G02B 6/024*** | (2006.01) |
| ***G02B 6/26*** | (2006.01) |
| ***G02F 1/365*** | (2006.01) |
| ***H01S 3/23*** | (2006.01) |
| ***H01S 3/136*** | (2006.01) |

(Continued)

(52) U.S. Cl.
CPC ............ *H01S 3/1308* (2013.01); *G02B 6/024* (2013.01); *G02B 6/264* (2013.01); *G02F 1/0121* (2013.01); *G02F 1/0136* (2013.01); *G02F 1/365* (2013.01); *H01S 3/06758* (2013.01); *H01S 3/06783* (2013.01); *H01S 3/08013* (2013.01); *H01S 3/1301* (2013.01); *H01S 3/1305* (2013.01); *H01S 3/136* (2013.01); *H01S 3/1307* (2013.01); *H01S 3/2308* (2013.01); *H01S 3/2383* (2013.01)

(58) Field of Classification Search
CPC .. G02B 6/0056; G02B 6/02109; G02B 6/024; G02B 6/27; G02B 6/126; G02B 6/264; G02B 6/272; G02B 6/276; G02B 6/278; G02B 6/356; G02B 6/2766; G02B 6/2773; G02B 6/2786; G02B 6/2793; G02B 6/3592; G02B 6/3594; G02F 1/0121; G02F 1/0126; G02F 1/0136; G02F 1/353; G02F 1/365; G02F 1/1335; G02F 1/3132; G02F 1/3515; G02F 1/133536; G02F 1/133541; G02F 2/00; G02F 2/004; G02F 2001/0139; H01S 3/06758; H01S 3/06783; H01S 3/08013; H01S 3/1301; H01S 3/1305; H01S 3/1307; H01S 3/136; H01S 3/2308; H01S 3/2383
USPC ....... 359/239, 279, 290, 333, 334, 337, 364, 359/491, 624; 356/5.14, 73.1; 372/10, 372/18, 25, 29.016, 92, 98, 102; 398/65, 398/75, 152, 185
See application file for complete search history.

(56) References Cited

U.S. PATENT DOCUMENTS 8,493,650 B2 7/2013 Rothenberg et al.
9,362,714 B1 6/2016 Goodno et al.
(Continued)

*Primary Examiner* — Mustak Choudhury
(74) *Attorney, Agent, or Firm* — John A. Miller; Shumaker, Loop & Kendrick, LLP

(57) ABSTRACT

A fiber laser amplifier system that employs a technique for reducing polarization modulation instability (PMI) in a delivery fiber. The system includes a fiber amplifier that amplifies a seed beam and provides the amplified seed beam to a weakly polarization maintaining (PM) delivery fiber that delivers the amplified beam to a certain location. The polarization of the seed beam is controlled so that it aligns with the slow axis of the delivery fiber such that nonlinear birefringence that occurs in the delivery fiber is added to the natural birefringence of the delivery fiber so as to suppress the PMI in the delivery fiber.

20 Claims, 2 Drawing Sheets

(51) Int. Cl.
*H01S 3/067* (2006.01)
*H01S 3/08* (2006.01)

(56) References Cited

U.S. PATENT DOCUMENTS

2012/0188626 A1* 7/2012 Rothenberg ........ H01S 3/06712
359/239
2016/0013607 A1* 1/2016 McComb ............ H01S 3/06704
372/6

* cited by examiner

SUPPRESSION OF POLARIZATION MODULATION INSTABILITY IN HIGH POWER FIBER AMPLIFIER SYSTEMS

GOVERNMENT CONTRACT

This invention was made with Government support under contract HR0011-15-C-0075 awarded by DARPA. The Government has certain rights in the invention.

BACKGROUND

Field

This invention relates generally to a fiber laser amplifier system that provides a high power output beam and, more particularly, to a fiber laser amplifier system that includes a weakly polarization maintaining (PM) delivery fiber and a polarization analyzer that is aligned with the slow polarization axis of an output beam propagating along the slow axis of the delivery fiber so that nonlinear birefringence that occurs in the delivery fiber is added to a natural birefringence of the delivery fiber so as to suppress polarization maintaining instability in the delivery fiber.

Discussion

High power laser amplifiers have many applications, including industrial, commercial and military. Designers of laser amplifiers are continuously investigating ways to increase the power of the laser amplifier for these and other applications. One known type of laser amplifier is a fiber laser amplifier that employs a doped fiber that receives a seed beam and a pump beam to amplify the seed beam and generate the laser output beam, where the fiber typically has an active core diameter of about 10-20 μm.

Improvements in fiber laser amplifier designs have increased the output power of the fiber amplifier to approach its practical power and beam quality limit. To further increase the output power some fiber laser systems employ multiple fiber laser amplifiers that combine the amplified beams in some fashion to generate higher beam powers. A design challenge for fiber laser amplifier systems of this type is to combine the beams from a plurality of fiber amplifiers in a manner so that the beams provide a single beam output having a uniform phase over the beam diameter such that the beam can be focused to a small focal spot. Focusing the combined beam to a small spot at a long distance (far-field) defines the quality of the beam.

Known methods for generating high power, near diffraction-limited beams for directed energy lasers includes utilizing spectral beam combining (SBC) or coherent beam combining (CBC) of multiple narrow-line width fiber amplifiers. Typically, the size, weight and misalignment sensitivity of the beam combining optics scale directly with the number of fibers. Hence, maximizing power per fiber enables scaling to higher system powers in smaller and more robust packages. However, it is difficult to scale individual fiber laser amplifier powers above a few kilowatts because of numerous physical and engineering limitations, such as stimulated Brillouin scattering (SBS), self phase modulation (SPM), spatial mode instabilities, thermal limits on pump power handling and diode pump brightness.

Fiber laser amplifier systems that employ SBC and CBC architectures are often useful for directed energy (DE) laser weapons systems because of their high efficiency, high power scalability and excellent beam quality. In addition, the guided wave nature of light propagation in fiber enables packaging of beam combined fiber sources on fielded platforms. For many DE laser systems, especially those related to air platform self-defense, it is advantageous to emit beams from multiple beam directors on the platform to provide enhanced field of regard and protect against threats arriving from any angle. For platform integration, it is generally desirable to route laser beam power from a laser source engine, which typically requires substantial electrical input power and generates substantial waste heat, to a remote beam director that is relatively isolated from electrical power sources or heat sinks. Depending on the platform geometry, there may be a need to propagate multiple kilowatts of single-mode laser power over many meters of fiber.

When high power, single-mode light propagates through long lengths of fiber, various non-linear effects can arise because of the fiber Kerr nonlinearity, which causes the index of refraction of the fiber to change in response to the power and polarization of the light. This can degrade the optical coherence or spectral purity of the light. The most apparent manifestation of the Kerr nonlinearity is typically self-phase modulation (SPM), which can degrade coherence by converting small levels of amplitude modulation (AM) into frequency modulation (FM). This nonlinear impairment can limit the efficiency of CBC or the beam quality of SBC, thus reducing the performance of the laser system. To avoid such impairments, it is generally necessary to limit the power x length product of the fiber propagation, which can constrain packaging options for laser weapons systems, particularly those on air platforms.

A relatively new manifestation of the Kerr nonlinearity has been observed in fiber laser systems that effectively limits coherent power transmission to power-length products that are smaller than the level at which SPM becomes problematic. Specifically, polarization instability has been observed for a laser field in a fiber if the power of the laser field is high enough and/or the length of the fiber is long enough. Thus, the ability to combine beams emitted from these types of fiber laser systems becomes more problematic. Further, the change in the index of refraction of the fiber as a result of the Kerr effect will be larger in the direction of polarization of the laser field than it will be along the direction perpendicular to the polarization of the laser field. This in turn causes nonlinear birefringence in the fiber. As a result of the length of the fiber and the power of the laser field, when this induced birefringence in the fiber exceeds the natural birefringence of the fiber, polarization instability becomes an issue. The nonlinear impairment manifests as a sudden threshold onset of high speed, unstable fluctuations in the output state of polarization (SOP) following transmission of multi-kilowatt power through long lengths of non-polarization maintaining (non-PM) fiber.

This polarization instability is a well understood phenomenon in the art, and is sometimes referred to as vector modulation instability or polarization modulation instability (PMI). In general, the response of a nonlinear optical medium to a polarized laser field will be anisotropic, i.e., there is a larger nonlinear change in the mediums refractive index for light polarized parallel to the driving field than for light polarized perpendicularly to the driving field. If the nonlinear medium is only weakly birefringent or isotropic, such as in a non-PM transmission fiber, then as the laser power increases there will be a critical threshold power level at which the induced nonlinear birefringence in the fiber equals the natural birefringence. If the laser field SOP is aligned so that the induced nonlinear birefringence cancels the fiber natural birefringence, for example, along the fast axis of the fiber, then any small fluctuations in the input beam power can be greatly amplified resulting in fluctuations of the output SOP. Alternatively, if the laser field SOP is configured so that the induced nonlinear birefringence is aligned with the fiber natural birefringence, then the two effects add and the output SOP remains stably polarized.

While the strength of most nonlinear effects scales as the power x length product (B-integral) in the fiber, the gain for PMI for the relatively low perturbation frequency of interest instead scales as the square root of power x length. Hence, for any given B-integral limited configuration, i.e., for a given power-length product, PMI will be more of a limitation for configurations that utilize relatively long fibers and relatively modest powers.

It has been shown that nonlinear PMI is a pervasive problem that effectively limits generation and propagation of high fiber laser power with a high polarization extinction ratio (PER) in long fibers. This effectively prevents CBC above the threshold level for PMI since beams must be co-polarized to constructively interfere for CBC. Moreover, a high PER of the laser source is often desirable or required for compatibility with optical components, such as spectral beam combining optics and gratings, beam splitters, dichroic wavelength separating elements for shared-aperture imagers, etc. Hence, there is a need for a technique for generating and transmitting high power laser fields over long lengths of fiber without incurring PMI.

An obvious solution to the above described problem is to use a PM fiber instead of a non-PM fiber. The higher birefringence of a PM fiber can effectively raise the critical power threshold for PMI beyond the operating power level. However, for the large mode area (LMA), multimode fibers typically used to generate and propagate kW power laser fields, the large birefringence of a standard PM fiber can be problematic since it can perturb the wave guiding properties of the fiber, which leads to spatial coupling to higher order modes depending on the SOP. This degrades the beam quality and coherence of the output beam. Hence, due to high order mode coupling, typical kW-class fiber laser amplifiers based on large mode area fibers cannot readily employ PM fibers to prevent PMI.

It is known in the art that PMI can be suppressed by tightly coiling a non-PM fiber. When a fiber is bent, it exhibits stress-induced birefringence that can increase the critical threshold for PMI. The birefringence of a bent fiber typically scales as approximately $(r_{fiber}/r_{coil})^2$, where $r_{fiber}$ and $r_{coil}$ are the fiber cross-sectional radius and the coil radius, respectively. Calculations show that a fiber bend radius of less than 40 cm may be required to raise the PMI threshold for a typical 400 μm diameter delivery fiber above a few kW. Thus, by increasing the natural birefringence of the fiber as a result of stress induced coiling, the amount of power required to cause the PMI induced birefringence to exceed a natural birefringence increases. However, since the purpose of a delivery fiber in the context of a laser weapons system is to bridge long multi-metered distances between subsystems, fiber coiling does not provide a useful solution for PMI suppression given practical fabrication limits on fiber diameters less than 800 μm.

U.S. Pat. No. 8,493,650, titled, Method and Apparatus for Suppression of Four-Wave Mixing Using Polarization Control with a High Power Polarization Maintaining Fiber Amplifier System, assigned to the assignee of this application, discloses one known approach to enable the use of PM fibers in the LMA regime. The '650 patent discloses the use of a weakly birefringent PM fiber to minimize HOM coupling with sufficiently large birefringence so that the birefringent beat length of the fiber is less than the nonlinear gain length. The system employs a polarization controller configured to lock the SOP to provide equal power along each of the fiber birefringent axes. This has been shown to be advantageous for suppression of SBS or other four-wave mixing (FWM) effects, and such a configuration should also serve to eliminate PMI.

However, the laser system disclosed in the '650 patent is unnecessarily restrictive and non-optimally configured for the purpose of suppressing PMI for at least two reasons. First, while the configuration of the system with equal power along each fiber PM axis is optimal for FWM and SBS suppression, it is non-optimal for suppressing PMI. Rather, with sufficient fiber birefringence, PMI may be suppressed for any SOP, although the SOP aligned with the fiber slow axis will always have the highest threshold. Second, the requirement of the system for the fiber beat length to be less than the non-linear gain length is unnecessarily restrictive for the purpose of suppressing PMI. This requirement can lead to higher than necessary levels of fiber birefringence, such as $10^{-5}$, and may limit the use of expanded mode fiber designs, such as adiabatically up-tapered step index fibers, that are highly sensitive to high order mode coupling.

U.S. Pat. No. 9,362,714, titled, Architecture for All-Fiber Delivery of Coherently Combined Laser Power, also assigned to the assignee of this application, and herein incorporated by reference, discloses another known approach for suppressing PMI. The '714 patent discloses the use of a PM delivery fiber spliced downstream of an all fiber coherent combining element with the intended purpose of suppressing cross-phase modulation (XPM) between the input lasers, which, in the context of multi-channel polarization controllers, has been found to prevent active control of the individual laser SOPs. Both XPM and PMI have the same origin in the anisotropic nonlinear Kerr response of the medium. The use of a PM fiber prevents cross-coupling between the SOPs of the input fields, thus eliminating XPM a source of multi-channel control error.

As mentioned above, a PM delivery fiber would also suppress PMI. However, the configuration of the '714 system is specific to the case of a multi-channel field interaction between multiple coherently combined beams co-propagating in the same fiber with multiple active polarization controllers, and it does not cover the configuration for only a single fiber source or a single polarization controller. The laser system disclosed in the '714 patent also discloses the use of adiabatic fiber tapers as delivery fibers when used in combination with all-fiber combiners. In an adiabatic fiber taper, the fiber cross-section varies smoothly along the fiber length, thus enabling substantial mode field expansion with a very small insertion loss. An adiabatic fiber taper can provide three times or more of an increase in the mode field area compared to an untapered fiber with a concurrent three times decrease in the optical core irradiance and nonlinearity.

SUMMARY

The present invention discloses and describes a fiber laser amplifier system that employs a technique for reducing PMI in a delivery fiber. The system includes a master oscillator that generates a seed beam and at least one polarization modulator that receives the seed beam and controls the polarization of the seed beam. The system further includes at least one fiber amplifier that receives the polarization controlled seed beam and a weakly PM delivery fiber coupled to the at least one fiber amplifier and delivering the amplified beam to a delivery location, where the PM delivery fiber has a fast axis and a slow axis. The system also includes a beam sampler that receives the amplified beam at or proximate to the delivery location that generates a sample beam, and a polarization analyzer that receives the sample beam and is oriented to transmit light polarized parallel to the slow axis of the delivery fiber. The system further includes a detector that receives the sample beam after it has propagated through the polarization analyzer, where the detector converts the sample beam to an electrical signal that provides a measurement of the power of the sample beam. The system also includes a polarization controller that receives the electrical signal from the detector and controls the polarization modulator so as to orient the polarization of the seed beam so that it aligns with the slow axis of the PM delivery fiber such that nonlinear birefringence that occurs in the delivery fiber is added to the natural birefringence of the delivery fiber so as to suppress the PMI in the delivery fiber.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a high power fiber laser amplifier system employing a weakly PM delivery fiber is merely exemplary in nature, and is in no way intended to limit the invention or its applications or uses.

Figure 1:
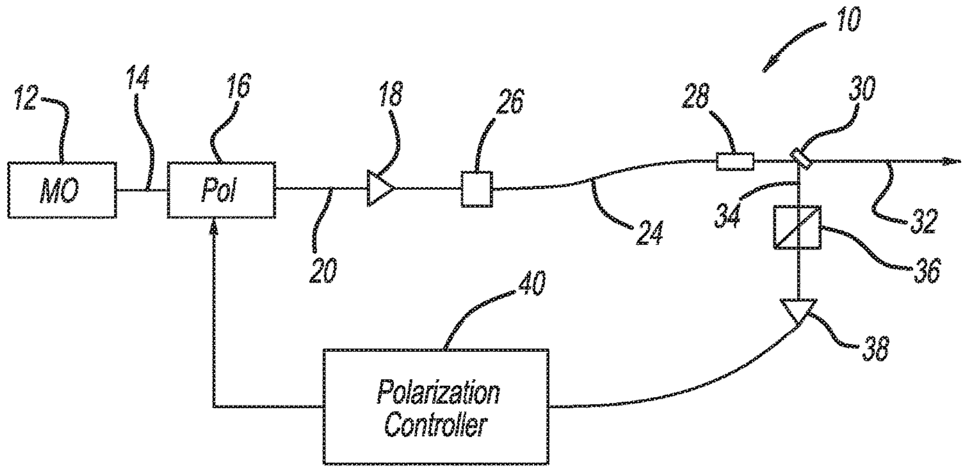
FIG. 1 is a schematic diagram of a high power fiber laser amplifier system.

FIG. 1 is a schematic diagram of a fiber laser amplifier system 10 including a master oscillator (MO) 12 that generates a seed beam on a fiber 14. The seed beam is sent to a polarization modulator 16 on the fiber 14 that controls the polarization of the seed beam that is then sent to a fiber amplifier 18 on a fiber 20, where the fiber amplifier 18 is typically a doped amplifying portion of the fiber 20 that receives an optical pump beam (not shown). The fiber amplifier 18 is either a non-PM or a weakly PM fiber amplifier in order to generate the kW output power in predominantly a single mode. The fiber amplifier 18 is intended to represent one or more fiber amplifiers in a chain of amplifiers for amplifying the seed beam to the desired power level. Although only a single fiber amplifier stage is shown in this design, it will be understood by those skilled in the art that the seed beam from the MO 12 can be split into multiple seed beams each being sent to a separate polarization controller and a separate fiber amplifier, where the amplified beams are then coherently combined before being delivered to certain beam directors. Fiber laser amplifier systems of this type are generally discussed in the '714 patent.

The fiber amplifier 18 is coupled to a weakly PM delivery fiber 24 by a coupler 26, such as a fusion splice or a tapered fiber bundle (TFB), where the delivery fiber 24 has a desired length, for example, at least 1 m, to provide the amplified beam to a certain location, such as a particular beam director (not shown). As defined herein, a "weakly PM" fiber has a birefringence that is larger than what the natural nonlinear birefringence of the fiber is without suffering from the issues discussed above for a full PM delivery fiber, i.e., perturb the waveguide modes that leads to a loss of beam quality. As is understood by those skilled in the art, birefringent elements have slightly different indices of refraction for light polarized in different orientations. The birefringent element can be defined as having a fast axis and a slow axis, where light polarized along the fast axis encounters a lower index of refraction in the element and travels faster through the element than light polarized along the slow axis. The delivery fiber 24 is coupled to an end cap 28, or other optical element, that directs the amplified laser beam into free space towards a beam sampler 30. The beam sampler 30 splits the free space beam into a main output beam 32 having most of the beam power that is directed towards the target (not shown) and a sample beam 34 having low power that is sent to a polarization analyzer 36 that is oriented to transmit light polarized parallel to the slow axis of the delivery fiber 24. The sample beam 34 that propagates through the analyzer 36 is then sent to a detector 38, such as a photodiode, that converts the sample beam 34 to an electrical signal that is provided to a polarization controller 40.

The polarization controller 40 controls the polarization modulator 16 so that the SOP of the amplified beam is locked to the slow axis of the delivery fiber 24. For example, the controller 40 causes the modulator 16 to dither the polarization of the seed beam and uses a hill-climbing or other algorithm to maximize the power of the electrical signal. Aligning the polarization of the seed beam to the slow axis of the delivery fiber 24 provides optimal suppression of PMI because the nonlinear birefringence adds to the natural PM fiber birefringence. In other words, by aligning the SOP of the amplified beam with the slow axis of the delivery fiber 24, the nonlinear birefringence that could cause PMI adds to the PM fiber birefringence. Since in the slow axis orientation the nonlinear birefringence adds to the PM fiber birefringence, a smaller fiber birefringence is needed to suppress the PMI than would be required for other SOP orientations. The calculated magnitude of the fiber birefringence needed to suppress the PMI is much less than that needed to suppress FWM or SBS, where approximately $10^{-6}$ to $10^{-7}$ appears sufficient for most configurations.

Figure 2:
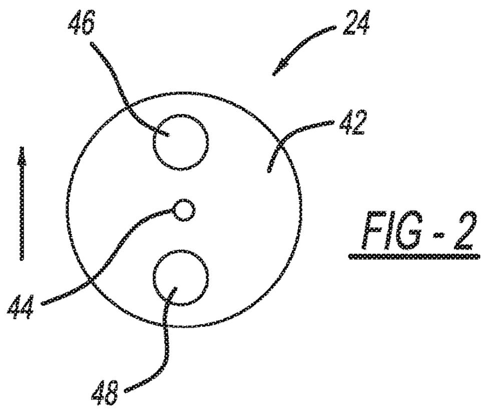
FIG. 2 is a cross-sectional view of a delivery fiber employed in the fiber laser amplifier system shown in FIG. 1.

Typically, PM fiber structures employ geometrically or optically asymmetric structural elements, such as doped stress rods, arranged around the fiber core that either impose stress across the core or otherwise act to break the azimuthal waveguide symmetry and induce core birefringence. FIG. 2 is a cross-sectional view of the delivery fiber 24 showing one technique of how the delivery fiber 24 can be made weakly PM. The delivery fiber 24 includes an outer cladding layer 42 surrounding an inner core 44, where the beam propagates down the core 44 and is confined therein as a result of the outer cladding layer 42 having a lower index of refraction than the core 44. The delivery fiber 24 also includes a pair of opposing doped stress rods 46 and 48 provided on opposite sides of the core 44, as shown, that extend the length of the fiber 24 in the cladding layer 42 that impose the stress across the core 44. In other words, the stress induced by the stress rods 46 and 48 interacts with the core 44 to create a higher index of refraction for light polarized in the direction aligned with the rods 46 and 48. Thus, for the delivery fiber 24, the stress rods 46 and 48 create the slow axis orientation through the stress rods 46 and 48 as depicted by the arrow. The stress rods 46 and 48 are typically glass rods made of a slightly different material then the outer cladding 42. However, in alternate embodiments, other structural elements can be arranged around the fiber core 44 to provide this induced birefringence across the core 44.

As discussed above, PMI can originate in either the delivery fiber 24 or internally within the fiber amplifier 18. The configuration of the laser system 10 can suppress the PMI that may originate in both locations. For the embodiment of suppressing PMI that originates in the fiber amplifier 18 that is not a PM fiber, the delivery fiber 24 should optimally be coupled to the fiber amplifier 18 so that the effective slow axis of both fibers are aligned.

Figure 3:
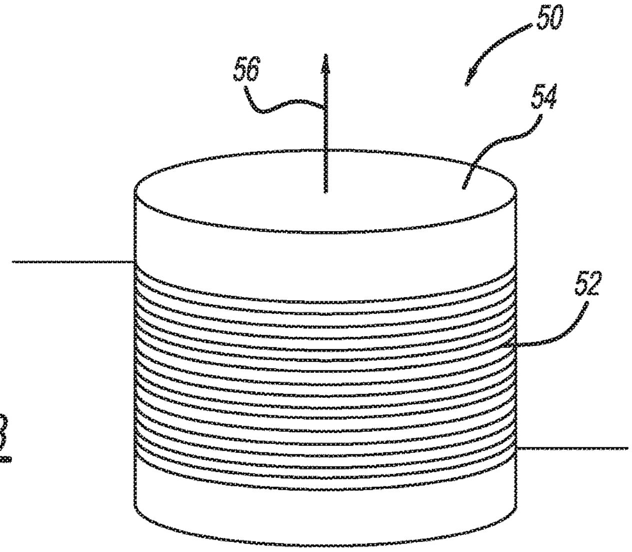
FIG. 3 is an isometric view of a fiber amplifier coil that can be employed in the fiber laser amplifier system shown in FIG. 1.

FIG. 3 is an isometric view of a fiber amplifier 50 that can be employed as the fiber amplifier 18, where the fiber amplifier 50 includes a fiber coil 52 wrapped around a cylindrical mandrel 54. The fiber amplifier 50 may be configured as a coil for packaging purposes, where it requires reduced space. As mentioned above, wrapping a fiber in a coil configuration causes a stress-induced coiling birefringence whose slow axis is typically parallel to the fiber coiling axis as represented by arrow 56. By understanding that the direction of the coil axis defines the slow axis of the induced birefringence, the end of the coil 52 coupled to the delivery fiber 24 by the coupler 26 can be properly aligned to the slow axis of the delivery fiber 24 to suppress the PMI induced in the fiber amplifier 18 as discussed above.

It is often desirable to provide an adiabatic taper to the delivery fiber in these types of fiber laser amplifier systems so as to increase the size of the fiber core from a smaller end to a larger end to spread out the power in the core, which reduces the effects of the nonlinear issues discussed above. However, as the size of the core increases, the ability to maintain the wave guiding properties of the core is reduced, where the light propagating in the lower single propagation mode often couples into higher order modes that have a more degraded beam quality. By tapering the delivery fiber, the size of the core can be gradually increased, which reduces coupling into the higher order modes, and allows a reduction in the nonlinear effects.

However, for PM fibers that have stress rods, it is often difficult to provide the taper without the stress rods interfering with the core. In other words, the amount of induced stress in the core at the small diameter end of a tapered fiber is significantly larger than the amount of stress induced in the core at the large diameter end of the fiber. Thus, this change in the index of refraction has the effect of increasing the coupling into the higher order modes. Because small levels of birefringence are required to suppress PMI, the necessary and isotropic stress-inducing elements, i.e., the rods 46 and 48, in the delivery fiber 24 may be located spatially remote from the fiber core 44, such as at a distance of many 10 s to about 100 μm away from the core 44. Because of the small necessary birefringence and the resulting large tolerance to the core/stress rod separation and profile, the ability to manufacture weakly adiabatic fiber tapers that do not induce spatial mode coupling that would otherwise cause beam propagation in higher order modes, and thus preserve the beam quality of the transmitted light is feasible. Hence, because the level of induced birefringence is low as discussed above, and the delivery fiber 24 can be a weakly PM delivery fiber, it is possible to replace the delivery fiber 24 with an adiabatically tapered fiber to further reduce the PMI.

Figure 4:
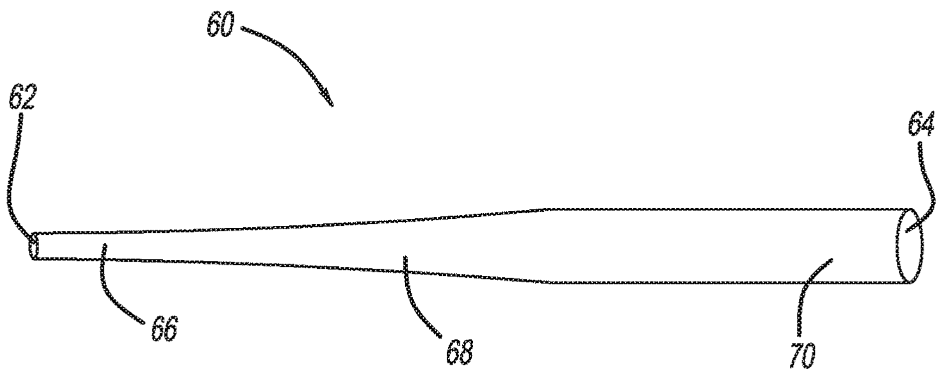
FIG. 4 is a side view of a tapered weakly PM delivery fiber that can be employed in the fiber amplifier system shown in FIG. 1.

FIG. 4 is a side view of an adiabatically tapered PM delivery fiber 60 that could replace the delivery fiber 24 that includes an input end 62 that would be coupled to the coupler 26 and an output end 64 that would be coupled to the end cap 28. The delivery fiber 60 includes a small diameter straight input section 66, a tapered section 68 that gradually increases the diameter of the delivery fiber 60, and a large diameter straight output section 70 that has a continuous diameter.

Figure 5:
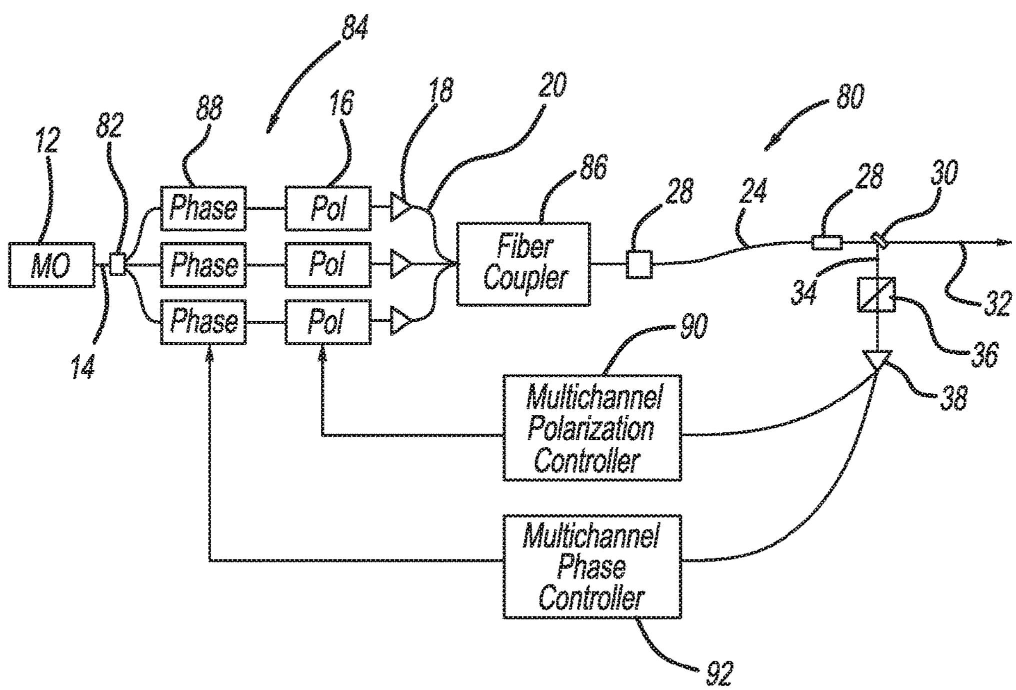
FIG. 5 is a schematic diagram of a high power fiber laser amplifier system that employs a CBC architecture and a weakly PM delivery fiber.

As mentioned above, eliminating the effects of PMI for long delivery fibers allows for a better ability to employ CBC. FIG. 5 is a schematic diagram of a fiber laser amplifier system 80 having a CBC architecture and benefiting from the embodiments discussed above to suppress PMI, where like elements to the system 10 are identified by the same reference number. In this embodiment, the output of the MO 12 is split by a beam splitter 82 and provided on a plurality of separate channels 84, where each channel 84 includes a polarization modulator 16 and a fiber amplifier 18. Each channel 84 also includes a phase modulator 88 that controls the phase of each of the split beams so that they are in phase with each other, and a fiber coupler 86, such as a TFB, that couples each of the fiber amplifiers 18. The polarization controller 40 is replaced with a multichannel polarization controller 90 to control the polarization modulators 16 in each of the channels 84. The system 80 also includes a multichannel phase controller 92 that controls the phase modulator 88 in each of the channels 84 based on the intensity of the signal from the detector 38 to provide the proper phase control of the split beams.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fiber laser amplifier system comprising:

a master oscillator generating a seed beam;

at least one polarization modulator responsive to the seed beam and controlling the polarization of the seed beam;

at least one fiber amplifier responsive to the polarization controlled seed beam and amplifying the seed beam;

a weakly polarization maintaining (PM) delivery fiber coupled to the at least one fiber amplifier and delivering the amplified beam to a delivery location, said delivery fiber having a fast axis and a slow axis;

a beam sampler responsive to the amplified beam at or near the delivery location and generating a sample beam;

a polarization analyzer responsive to the sample beam and being oriented to transmit light polarized along the slow axis of the delivery fiber;

a detector responsive to the sample beam after it has passed through the polarization analyzer, said detector converting the sample beam to an electrical signal that provides an indication of the power of the sample beam; and a polarization controller responsive to the electrical signal from the detector, said polarization controller controlling the polarization modulator so as to cause the polarization modulator to orient the polarization of the seed beam so that it aligns with the slow axis of the delivery fiber so that nonlinear birefringence that occurs in the delivery fiber as a result of propagation of the seed beam is combined with a natural birefringence of the delivery fiber that acts to increase the index of refraction of the delivery fiber along the slow axis so as to suppress polarization modulation instability in the delivery fiber.

2. The system according to claim 1 wherein the delivery fiber includes an outer cladding layer, an inner core through which the amplified beam propagates, and structures provided in the cladding layer that cause birefringence in the core to define the slow axis of the delivery fiber.

3. The system according to claim 1 wherein the at least one fiber amplifier is a fiber amplifier coil having a defined coil axis, said fiber coil being coupled to the delivery fiber so that stress-induced birefringence caused by coiling the fiber amplifier aligns with the slow axis of the delivery fiber.

4. The system according to claim 1 wherein the delivery fiber is an adiabatically tapered delivery fiber including a small diameter coupled to the laser amplifier, a large diameter of the delivery fiber is provided proximate to the delivery location, and a tapered portion therebetween.

5. The system according to claim 1 wherein the at least one polarization modulator is a plurality of polarization modulators and the at least one fiber amplifier is a plurality of fiber amplifiers, said system further comprising a beam splitter that splits the seed beam from the master oscillator into split beams where a separate split beam is provided to each polarization modulator, and a fiber coupler that couples the fiber amplifiers at an output end into the delivery fiber.

6. The system according to claim 5 further comprising a plurality of phase modulators each receiving one of the split beams and a phase controller that controls each of the phase modulators so that the phase of each of the amplified beams is in phase with each other in the fiber coupler.

7. The system according to claim 5 wherein the fiber coupler is a tapered fiber bundle.

8. The system according to claim 5 wherein the plurality of fiber amplifiers provide coherent beam combining.

9. The system according to claim 1 wherein the delivery fiber is at least 1 meter long.

10. A fiber laser amplifier system comprising:

a master oscillator generating a seed beam;

at least one polarization modulator responsive to the seed beam and controlling the polarization of the seed beam;

at least one fiber amplifier responsive to the polarization controlled seed beam;

a weakly polarization maintaining (PM) delivery fiber coupled to the at least one fiber amplifier and delivering the amplified beam to a delivery location, said PM delivery fiber having a fast axis and a slow axis, said PM delivery fiber including an outer cladding layer, an inner core through which the amplified beam propagates, and structures provided in the cladding layer that cause birefringence in the core to define the slow axis of the delivery fiber, said delivery fiber further being adiabatically tapered to have a small diameter coupled to the laser amplifier, a large diameter proximate to the delivery location, and a tapered portion therebetween;

a beam sampler responsive to the amplified beam at or near the delivery location and generating a sample beam;

a polarization analyzer responsive to the sample beam and being oriented to transmit light polarized along the slow axis of the delivery fiber;

a detector responsive to the sample beam after it has passed through the polarization analyzer, said detector converting the sample beam to an electrical signal that provides an indication of the power of the sample beam; and a polarization controller responsive to the electrical signal from the detector, said polarization controller controlling the polarization modulator so as to cause the polarization modulator to orient the polarization of the seed beam so that it aligns with the slow axis of the delivery fiber so that nonlinear birefringence that occurs in the delivery fiber as a result of propagation of the seed beam is combined with a natural birefringence of the delivery fiber that acts to increase the index of refraction of the delivery fiber along the slow axis so as to suppress polarization modulation instability in the delivery fiber.

11. The system according to claim 10 wherein the at least one fiber amplifier is a fiber amplifier coil having a defined coil axis, said fiber coil being coupled to the delivery fiber so that stress-induced birefringence caused by coiling of the fiber amplifier aligns with the slow axis of the delivery fiber.

12. The system according to claim 10 wherein the at least one polarization modulator is a plurality of polarization modulators and the at least one fiber amplifier is a plurality of fiber amplifiers, said system further comprising a beam splitter that splits the seed beam from the master oscillator into split beams where a separate split beam is provided to each polarization modulator, and a fiber coupler that couples the fiber amplifiers at an output end into the delivery fiber.

13. The system according to claim 12 further comprising a plurality of phase modulators each receiving one of the split beams and a phase controller that controls each of the phase modulators so that the phase of each of the amplified beams is in phase with each other in the fiber coupler.

14. The system according to claim 12 wherein the plurality of fiber amplifiers provide coherent beam combining.

15. The system according to claim 10 wherein the geometrically or optically asymmetric structures are opposing stress rods positioned within a cladding layer on opposite sides of a fiber core that causes birefringence induced stress in the core to define the slow axis of the delivery fiber.

16. A fiber laser amplifier system comprising:

a fiber amplifier responsive to a seed beam and amplifying the seed beam;

a weakly polarization maintaining (PM) delivery fiber coupled to the fiber amplifier and delivering the amplified beam to a delivery location, said delivery fiber having a fast axis and a slow axis; and a polarization analyzer that receives the amplified beam from the delivery fiber being oriented to transmit light polarized along the slow axis of the delivery fiber, wherein the polarization of the seed beam is controlled so that it aligns with the slow axis of the delivery fiber so that nonlinear birefringence that occurs in the delivery fiber as a result of propagation of the seed beam is combined with a natural birefringence of the delivery fiber that acts to increase the index of refraction of the delivery fiber along the slow axis so as to suppress polarization modulation instability in the delivery fiber.

17. The system according to claim 16 wherein the delivery fiber includes an outer cladding layer, an inner core through which the amplified beam propagates, and structures provided in the cladding layer that cause birefringence in the core to define the slow axis of the delivery fiber.

18. The system according to claim 16 wherein the fiber amplifier is a fiber amplifier coil having a defined coil axis, said fiber coil being coupled to the delivery fiber so that stress-induced birefringence caused by coiling the fiber amplifier aligns with the slow axis of the delivery fiber.

19. The system according to claim 16 wherein the delivery fiber is an adiabatically tapered delivery fiber including a small diameter coupled to the laser amplifier, a large diameter of the delivery fiber is provided proximate the delivery location, and a tapered portion therebetween.

20. The system according to claim 16 wherein the delivery fiber is at least 1 meter long.

* * * * *